(12) United States Patent
Inagaki et al.

(10) Patent No.: US 11,318,662 B2
(45) Date of Patent: *May 3, 2022

(54) LAYERED POLYESTER FILM

(71) Applicants: TOYOBO CO., LTD., Osaka (JP);
Furanix Technologies B.V., Amsterdam (NL)

(72) Inventors: Jun Inagaki, Otsu (JP); Yukihiro Numata, Otsu (JP); Jesper Gabriel Van Berkel, Amsterdam (NL)

(73) Assignees: TOYOBO CO., LTD., Osaka (JP);
Furanix Technologies B.V., Amsterdam (NL)

(*) Notice: Subject to any disclaimer, the term of this patent is extended or adjusted under 35 U.S.C. 154(b) by 253 days.

This patent is subject to a terminal disclaimer.

(21) Appl. No.: 16/066,212

(22) PCT Filed: Dec. 26, 2016

(86) PCT No.: PCT/JP2016/088617
§ 371 (c)(1),
(2) Date: Jun. 26, 2018

(87) PCT Pub. No.: WO2017/115736
PCT Pub. Date: Jul. 6, 2017

(65) Prior Publication Data
US 2020/0269559 A1 Aug. 27, 2020

(30) Foreign Application Priority Data

Dec. 28, 2015 (JP) .............................. JP2015-257295

(51) Int. Cl.
| | |
|---|---|
| *B29C 55/12* | (2006.01) |
| *B32B 7/035* | (2019.01) |
| *B32B 9/00* | (2006.01) |
| *B32B 9/04* | (2006.01) |
| *B32B 27/36* | (2006.01) |
| *C08J 7/043* | (2020.01) |
| *C08J 7/048* | (2020.01) |
| *C08G 63/123* | (2006.01) |
| *C08G 63/12* | (2006.01) |
| *C08G 63/127* | (2006.01) |

(Continued)

(52) U.S. Cl.
CPC .............. *B29C 55/12* (2013.01); *B32B 7/035* (2019.01); *B32B 9/005* (2013.01); *B32B 9/045* (2013.01); *B32B 27/36* (2013.01); *C08J 7/043* (2020.01); *C08J 7/048* (2020.01); *B32B 2255/20* (2013.01); *B32B 2255/205* (2013.01); *B32B 2307/306* (2013.01); *B32B 2307/308* (2013.01); *B32B 2307/412* (2013.01); *B32B 2307/518* (2013.01); *B32B 2307/704* (2013.01); *B32B 2307/7242* (2013.01); *B32B 2307/7244* (2013.01); *B32B 2307/732* (2013.01); *B32B 2307/734* (2013.01); *B32B 2307/736* (2013.01); *B32B 2311/24* (2013.01); *B32B 2315/00* (2013.01); *B32B 2367/00* (2013.01); *C08G 63/12* (2013.01); *C08G 63/123* (2013.01); *C08G 63/127* (2013.01); *C08G 63/18* (2013.01); *C08G 2230/00* (2013.01); *C08L 67/02* (2013.01); *C08L 2203/16* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | |
|---|---|---|---|
| 2,551,731 A | 5/1951 | Gordon et al. | |
| 4,439,479 A | 3/1984 | Kanai et al. | |

(Continued)

FOREIGN PATENT DOCUMENTS

| | | |
|---|---|---|
| CN | 101899145 A | 12/2010 |
| CN | 101899145 A * | 12/2010 |

(Continued)

OTHER PUBLICATIONS

"The Furan Counterpart to Poly(ethylene terephthalate): An Alternative Material Based on Renewable Resources" Journal of Polymer Science: Part A: Polymer Chemistry, vol. 47, 295-298 (2009) (Year: 2009).*

Taiwan Intellectual Property Office, First Office Action in Taiwanese Patent Application No. 105143160 (dated Apr. 27, 2020).

Taiwan Intellectual Property Office, First Office Action in Taiwanese Patent Application No. 105143162 (dated Apr. 27, 2020).

European Patent Office, Extended European Search Report in European Patent Application No. 16881712.0 (dated Jun. 26, 2019).

Australian Patent Office, Examination Report in Australian Patent Application No. 2016381909 (dated May 5, 2020).

(Continued)

*Primary Examiner* — Vivian Chen
(74) *Attorney, Agent, or Firm* — Leydig, Voit & Mayer, Ltd.

(57) ABSTRACT

To provide a layered polyester film having excellent mechanical properties, transparency, heat resistance, and in particular excellent gas barrier property. A layered polyester film containing a polyester film and a thin film layer including mainly an inorganic compound, wherein the polyester film is a biaxially oriented polyester film including a dicarboxylic acid component containing mainly a furandicarboxylic acid and a glycol component containing mainly ethylene glycol, the thin film layer is formed on at least one surface of the polyester film, the inorganic compound is at least one of aluminum oxide and silicon oxide, and the layered polyester film has a plane orientation coefficient ΔP of not less than 0.100 and not more than 0.200, a film thickness of not thinner than 1 μm and not thicker than 300 μm, and an oxygen permeability of not less than 0.1 mL/m²/day/MPa and not more than 80 mL/m²/day/MPa under a temperature of 23° C. and a humidity of 65%.

4 Claims, No Drawings

(51) Int. Cl.
    C08G 63/18    (2006.01)
    C08L 67/02    (2006.01)

(56) References Cited

U.S. PATENT DOCUMENTS

| | | | |
|---|---|---|---|
| 5,096,784 A | 3/1992 | Culbertson et al. | |
| 5,128,206 A | 7/1992 | Fiard et al. | |
| 6,254,996 B1 | 7/2001 | Fukuda et al. | |
| H1982 H | 8/2001 | Dunn et al. | |
| 10,407,555 B2* | 9/2019 | Inagaki | C08G 63/16 |
| 10,941,244 B2* | 3/2021 | Inagaki | C08J 7/044 |
| 2004/0146724 A1 | 7/2004 | Peiffer et al. | |
| 2005/0100723 A1* | 5/2005 | Tanaka | C08L 2666/18 |
| | | | 428/220 |
| 2008/0015108 A1* | 1/2008 | Yamamoto | B41M 5/41 |
| | | | 503/227 |
| 2008/0038539 A1 | 2/2008 | Yokota et al. | |
| 2009/0032602 A1 | 2/2009 | Nishi et al. | |
| 2009/0124763 A1 | 5/2009 | Matsuda et al. | |
| 2011/0218316 A1 | 9/2011 | Drysdale et al. | |
| 2012/0053317 A1* | 3/2012 | Matsumura | C08J 5/18 |
| | | | 528/279 |
| 2012/0178897 A1* | 7/2012 | Nozawa | H01L 31/049 |
| | | | 528/308.1 |
| 2012/0207956 A1 | 8/2012 | Matsuda et al. | |
| 2012/0258299 A1 | 10/2012 | Matsuda et al. | |
| 2012/0288692 A1 | 11/2012 | Broyles et al. | |
| 2012/0288693 A1 | 11/2012 | Stanley et al. | |
| 2013/0011631 A1* | 1/2013 | Sakellarides | B32B 27/36 |
| | | | 428/195.1 |
| 2013/0095271 A1* | 4/2013 | Carman, Jr. | C08G 63/199 |
| | | | 428/36.92 |
| 2013/0344345 A1* | 12/2013 | Sakellarides | C08K 5/3475 |
| | | | 428/458 |
| 2014/0004286 A1* | 1/2014 | Sakellarides | B32B 27/08 |
| | | | 428/36.6 |
| 2014/0099455 A1* | 4/2014 | Stanley | B32B 27/32 |
| | | | 428/34.3 |
| 2014/0234493 A1 | 8/2014 | Forloni | |
| 2014/0322463 A1 | 10/2014 | Bashir et al. | |
| 2014/0336349 A1* | 11/2014 | Sipos | C08G 63/672 |
| | | | 528/285 |
| 2014/0363546 A1 | 12/2014 | Zhou et al. | |
| 2015/0004387 A1 | 1/2015 | Sargeant et al. | |
| 2015/0119548 A1* | 4/2015 | Takahashi | B29D 7/01 |
| | | | 528/308.2 |
| 2015/0141584 A1* | 5/2015 | Saywell | C08G 63/181 |
| | | | 525/444 |
| 2015/0251395 A1 | 9/2015 | Haak et al. | |
| 2015/0307704 A1 | 10/2015 | Bhattacharjee et al. | |
| 2015/0343746 A1* | 12/2015 | Bhattacharjee | B32B 27/08 |
| | | | 428/212 |
| 2015/0353692 A1* | 12/2015 | Bhattacharjee | C08J 5/18 |
| | | | 428/457 |
| 2016/0002395 A1 | 1/2016 | Matsuda et al. | |
| 2016/0108171 A1 | 4/2016 | Haruta et al. | |
| 2016/0200862 A1 | 7/2016 | Bastioli et al. | |
| 2016/0272771 A1* | 9/2016 | Goto | B32B 27/18 |
| 2016/0319066 A1 | 11/2016 | Shimoharai et al. | |
| 2017/0297256 A1* | 10/2017 | Kolstad | B32B 27/32 |
| 2017/0368807 A1 | 12/2017 | Sakellarides et al. | |
| 2018/0170019 A1 | 6/2018 | Fayet et al. | |
| 2018/0244878 A1 | 8/2018 | Inagaki et al. | |
| 2018/0311939 A1* | 11/2018 | Larrieu | B32B 27/10 |
| 2019/0106534 A1* | 4/2019 | Inagaki | C08J 7/0427 |
| 2019/0169384 A1 | 6/2019 | Goto et al. | |
| 2019/0225745 A1 | 7/2019 | Sakano et al. | |
| 2019/0366616 A1 | 12/2019 | Berny et al. | |
| 2019/0389189 A1* | 12/2019 | Hayakawa | B32B 27/36 |
| 2020/0269559 A1* | 8/2020 | Inagaki | C08J 7/043 |
| 2020/0269560 A1* | 8/2020 | Inagaki | C08J 7/0423 |
| 2021/0016484 A1* | 1/2021 | Hayakawa | B29C 48/305 |
| 2021/0147618 A1* | 5/2021 | Inagaki | C08J 7/056 |

FOREIGN PATENT DOCUMENTS

| | | | |
|---|---|---|---|
| CN | 101959941 A | | 1/2011 |
| CN | 103459148 A | * | 12/2013 |
| CN | 104053535 A | * | 9/2014 |
| CN | 104955646 A | * | 9/2015 |
| CN | 105143967 A | * | 12/2015 |
| EP | 2511320 A1 | | 10/2012 |
| EP | 3438164 A1 | | 2/2019 |
| JP | 11-010725 A | * | 1/1999 |
| JP | H11-010725 A | | 1/1999 |
| JP | 2000-119414 A | * | 4/2000 |
| JP | 2001-001399 A | | 1/2001 |
| JP | 2001-232739 A | * | 8/2001 |
| JP | 2001-342267 A | * | 12/2001 |
| JP | 2002-370277 A | * | 12/2002 |
| JP | 2003-071969 A | | 3/2003 |
| JP | 2003-200546 A | * | 7/2003 |
| JP | 2007-118476 A | * | 5/2007 |
| JP | 3982385 B2 | * | 9/2007 |
| JP | 4470491 B2 | * | 6/2010 |
| JP | 4881127 B2 | | 2/2012 |
| JP | 2012-094699 A | | 5/2012 |
| JP | 2012-229395 A | | 11/2012 |
| JP | 2013-155389 A | | 8/2013 |
| JP | 2015-157411 A | | 9/2013 |
| JP | 2014-043571 A | | 3/2014 |
| JP | 2014-073598 A | | 4/2014 |
| JP | 2015-506389 A | | 3/2015 |
| JP | 2015-098612 A | | 5/2015 |
| TW | 200951163 A | | 12/2009 |
| TW | 201518399 A | | 5/2015 |
| TW | 2016-015742 A | * | 5/2016 |
| TW | 201615742 A | | 5/2016 |
| WO | WO 2012/142271 A1 | | 10/2012 |
| WO | WO 2013/097013 A1 | | 7/2013 |
| WO | WO 2014/100256 A2 | | 6/2014 |
| WO | WO 2014/100265 A1 | | 6/2014 |
| WO | WO 2015/093524 A1 | | 6/2015 |
| WO | WO 2016/032330 A | * | 3/2016 |
| WO | WO 2016/032330 A1 | | 3/2016 |
| WO | WO 2016/123209 A1 | | 8/2016 |
| WO | WO 2017/038092 A1 | | 3/2017 |
| WO | WO 2017/115736 A1 | | 7/2017 |
| WO | WO 2017/115737 A1 | | 7/2017 |
| WO | WO 2017/169553 A1 | | 10/2017 |
| WO | WO 2018/012572 A1 | | 1/2018 |

OTHER PUBLICATIONS

China National Intellectual Property Administration, The Second Office Action in Chinese Patent Application No. 201680076574.4 (dated Mar. 16, 2020).
Indian Patent Office, Examination Report in Indian Patent Application No. 201847027693 (dated May 15, 2020).
China National Intellectual Property Administration, First Office Action in Chinese Patent Application No. 201680076574.4 (dated Aug. 21, 2019).
China National Intellectual Property Administration, First Office Action in Chinese Patent Application No. 201680076573.X (dated Aug. 30, 2019).
Hachihama et al., "Syntheses of Polyesters containing Furan Ring," *Technology Reports of the Osaka University*, 8(333): 475-480 (1958).
Japanese Patent Office, International Search Report in International Patent Application No. PCT/JP2016/088617 (dated Mar. 21, 2017).
Japanese Patent Office, International Search Report in International Patent Application No. PCT/JP2016/088618 (dated Mar. 21, 2017).
China National Intellectual Property Administration, First Office Action in Chinese Patent Application No. 201780021682.6 (dated Dec. 4, 2020).
China National Intellectual Property Administration, First Office Action in Chinese Patent Application No. 201880015127.7 (dated Oct. 22, 2020).
European Patent Office, Extended European Search Report in European Patent Application No. 18760798.1 (dated Dec. 8, 2020).

(56) References Cited

OTHER PUBLICATIONS

Japanese Patent Office, Notice of Reasons for Refusal in Japanese Patent Application No. 2017-559174 (dated Jan. 19, 2021).
Japanese Patent Office, Notice of Reasons for Refusal in Japanese Patent Application No. 2017-559175 (dated Jan. 19, 2021).
Australian Patent Office, Examination Report No. 1 in Australian Patent Application No. 2017242303 (dated Jun. 29, 2020).
European Patent Office, Extended European Search Report in European Patent Application No. 17774098.2 (dated Nov. 8, 2019).
European Patent Office, International Search Report in International Patent Application No. PCT/JP2016/003976 (dated Nov. 23, 2016).
Japanese Patent Office, Notification of Reasons for Refusal in Japanese Patent Application No. 2017-506943 (dated Sep. 13, 2017).
Japanese Patent Office, International Search Report in International Patent Application No. PCT/JP2017/008902 (dated May 16, 2017).
Japanese Patent Office, International Search Report in International Patent Application No. PCT/JP2018/007405 (dated May 29, 2018).
Taiwan Intellectual Property Office, First Office Action in Taiwanese Patent Application No. 106107343 (dated Jun. 16, 2020).
Nakajima et al., "The Recent Developments in Biobased Polymers toward General and Engineering Applications: Polymers that Are Upgraded from Biodegradable Polymers, Analogous to Petroleum-Derived Polymers, and Newly Developed," *Polymers*, 9: 523 (2017).
Omnexus, "Polyethylene Furanoate (PEF)—The Rising Star Amongst Today's Bioplastics" (2019) [obtained at: https://omnexus.specialchem.com/selection-guide/polyethylene-furanoate-pef-bioplastic].
China National Intellectual Property Administration, Rejection Decision in Chinese Patent Application No. 201680076574.4 (dated Aug. 24, 2020).
European Patent Office, Communication Pursuant to Article 94(3) EPC in European Patent Application No. 16881711.2 (dated Nov. 4, 2020).
U.S. Appl. No. 15/756,909, filed Mar. 1, 2018.
U.S. Appl. No. 16/066,232, filed Jun. 26, 2018.
U.S. Appl. No. 16/089,693, filed Sep. 28, 2018.
U.S. Appl. No. 16/490,205, filed Aug. 30, 2019.
U.S. Appl. No. 16/490,307, filed Aug. 30, 2019.
U.S. Appl. No. 17/162,351, filed Jan. 29, 2021.
Taiwan Intellectual Property Office, First Office Action in Taiwanese Patent Application No. 109146750 (dated Apr. 30, 2021).
China National Intellectual Property Administration, the Second Office Action in Chinese Patent Application No. 201880015127.7 (dated Apr. 8, 2021).
Japanese Patent Office, Notice of Reasons for Refusal in Japanese Patent Application No. 2018-508875 (dated Mar. 2, 2021).
Taiwan Intellectual Property Office, Second Office Action in Taiwanese Patent Application No. 105143160 (dated Mar. 30, 2021).
Taiwan Intellectual Property Office, First Office Action in Taiwanese Patent Application No. 107106833 (dated Apr. 16, 2021).
China National Intellectual Property Administration, the First Office Action in Chinese Patent Application No. 201880015158.2 (dated Jul. 6, 2021).
European Patent Office, Extended European Search Report in European Patent Application No. 18760795.7 (dated Dec. 11, 2020).
Japanese Patent Office, International Search Report in International Patent Application No. PCT/JP2018/007404 (dated May 29, 2018).
Japanese Patent Office, Notice of Reasons for Refusal in Japanese Patent Application No. 2019-503041 (dated Aug. 10, 2021).
Japanese Patent Office, Notice of Reasons for Refusal in Japanese Patent Application No. 2019-503042 (dated Aug. 10, 2021).
Korean Intellectual Property Office, Notice of Preliminary Rejection in Korean Patent Application No. 10-2019-7028221 (dated Sep. 9, 2021).
Korean Intellectual Property Office, Notice of Reason for Refusal in Korean Patent Application No. 10-2018-7030855 (dated Aug. 19, 2021).
Taiwanese Patent Office, First Office Action in Taiwanese Patent Application No. 107106834 (dated Jul. 20, 2021).
Taiwan Intellectual Property Office, Rejection Decision in Taiwanese Patent Application No. 105143162 (dated Jul. 21, 2021).
European Patent Office, Communication Pursuant to Article 94(3) EPC in European Patent Application No. 16767027.2 (dated Nov. 19, 2021).
Taiwan Intellectual Property Office, Rejection Decision in Taiwanese Patent Application No. 105143160 (dated Oct. 1, 2021).
Taiwan Intellectual Property Office, Rejection Decision in Taiwanese Patent Application No. 107106834 (dated Dec. 9, 2021).
Korean Intellectual Property Office, Notice of Preliminary Rejection in Korean Patent Application No. 10-2019-7028220 (dated Jan. 20, 2022).

\* cited by examiner

LAYERED POLYESTER FILM

CROSS-REFERENCE TO RELATED APPLICATIONS

This patent application is the U.S. national phase of International Patent Application No. PCT/JP2016/088617, filed Dec. 26, 2016, which claims the benefit of Japanese Patent Application No. 2015-257295, filed on Dec. 28, 2015, which are incorporated by reference in their entireties herein.

TECHNICAL FIELD

The present invention relates to a layered polyester film comprising a polyester film having a furandicarboxylic acid unit and a coating layer. More specifically, the present invention relates to a layered polyester film having excellent mechanical properties, transparency, heat resistance, and a gas barrier property and also having an excellent easily slidable property, and a film roll obtained by winding the film.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packing materials, and automobiles. Among plastic films, biaxially stretched PET films have been used widely for industrial and packing fields because of excellent balance between cost and mechanical strength, heat resistance, dimensional stability, chemical resistance, optical properties, etc.

In the field of industrial films, PET films can be used as functional films for flat panel displays (FPD) such as liquid crystal displays and plasma display because of having excellent transparency. Further, PET films provided with hydrolysis resistance have been used for films for solar cell back sheets and also used for various purposes such as functional films and base films.

In the field of packing films, PET films have been used for applications such as wrapping of foodstuff, shrink labels for bottles, and gas barrier films. Particularly, films excellent in gas barrier properties have been used as packing materials or gas shielding materials which are required to have air-tightness for foodstuff, pharmaceutical products, electronic parts, and the like, and there has been a growing demand for such films in recent years.

On the other hand, resins having biodegradability and resins produced from biomass-derived raw materials have drawn attention as environmentally friendly-type or environmentally sustainable-type materials.

From the above-mentioned viewpoint, many investigations have been performed for the purpose of providing a reproducible polymer for replacing petroleum derivatives such as PET. It is known that furandicarboxylic acids (FDCA) is similar to terephthalic acid in terms of solubility in hot water and stability to acidic reagents and FDCA has a planar structure, therefore furan type materials obtained by polycondensation of FDCA and diols have been proposed (Patent Document 1 and Non-Patent Document 1).

Only the melting point in the physical properties of these polymers disclosed is made clear, and mechanical strength is unclear. It is unknown whether or not thermoplastic resin compositions containing a furandicarboxylic acid unit can be used in the fields of industrial and packing films.

Polymer compounds usable for electric and electronic parts or the like by specifying the degree of polymerization have been proposed for thermoplastic resin compositions containing, mainly polybutylene furandicarboxylate (PBF), some kinds of furandicarboxylic acid units (Patent Document 2). Further, polyesters excellent in mechanical strength by specifying reduced viscosity and terminal acid value have been proposed (Patent Documents 3 and 4).

However, thermally press-molded products of PBF disclosed in Patent Document 2 have low transparency and are thus limited for uses in the fields of industrial and packing films. In the mechanical properties of 200 µm sheet products having a furandicarboxylic acid structure disclosed in Patent Documents 3 and 4, both breaking elongation and breaking strength are low and it is not conceivable to use such sheet products in the fields of industrial and packing films.

Sheets obtained from polyethylene furandicarboxylate (PEF), PEF derivatives and blends of PEF derivatives and copolymer polyesters have been investigated to be formed into uniaxially stretched films (Patent Documents 5 and 6).

Patent Document 5 discloses that as compared with a sheet made of a thermoplastic resin composition containing a furandicarboxylic acid unit, a film obtained by uniaxially stretching the sheet to 5 to 16 times is improved in breaking elongation, depending on the kinds of blends and the blending ratio of furandicarboxylic acid. However, no significant improvement in breaking elongation is confirmed unless cyclohexanedimethanol-copolymerized PET, which is widely known for improving breaking elongation, is blended. It must be said that the effect is limited depending on the blending ratio and the film has not been used so far in the fields of industrial and packing films.

Patent Document 6 discloses a PET film uniaxially stretched about 1.6 times by using rolling rolls. The film is shown to be a plastic film excellent in gas barrier properties, but it merely mentions the advantages of barrier properties derived from chemical structure of PEF, and mechanical strength which is important for packing materials is not made clear, so that the film has not been used so far in the field of gas barrier film containing a furandicarboxylic acid unit for packing.

CITATION LIST

Patent Literature

[Patent Document 1] U.S. Pat. No. 2,551,731
[Patent Document 2] Japanese Patent No. 4881127
[Patent Document 3] JP-A-2013-155389
[Patent Document 4] JP-A-2015-098612
[Patent Document 5] JP-T-2015-506389
[Patent Document 6] JP-A-2012-229395

NON PATENT LITERATURE

[Non-Patent Document 1] Y. Hachihama, T. Shono, and K. Hyono, Technol. Repts. Osaka Univ., 8, 475 (1958)

SUMMARY OF INVENTION

Technical Problem

Currently, the resin compositions each containing a furandicarboxylic acid proposed in the above-mentioned patent documents have been investigated for replacing PET.

But because of inferior mechanical properties, the resin compositions cannot be used for industrial and packing films. Further, no investigation is performed on heat resistance and transparency, and it is unknown whether or not the resin compositions are applicable in the fields of industrial and packing films.

In foodstuff packing, the contents thereof are deteriorated by oxygen or water vapor, etc. passing through the inside of the packing, and therefore an excellent barrier property has been required. With an increase in demand of food reserve for emergency in recent years, a further higher barrier property has been required for preventing the contents from being deteriorated for a long period.

In addition, due to environmental awareness, demands for films made of biomass-derived raw materials have been increasing.

The present invention is to provide a layered polyester film comprising a polyester film having a furandicarboxylic acid unit derived from biomass and a thin film layer including mainly an inorganic compound, the layered polyester film being usable for industrial and packing applications, wherein the layered polyester film has excellent mechanical properties, transparency, heat resistance, and in particular excellent gas barrier property.

Solution to Problem

Specifically, the film of the present invention is a layered polyester film comprising a polyester film and a thin film layer including mainly an inorganic compound, wherein the polyester film is a biaxially oriented polyester film including a dicarboxylic acid component containing mainly a furandicarboxylic acid and a glycol component containing mainly ethylene glycol, the thin film layer is formed on at least one surface of the polyester film, the inorganic compound is at least one of aluminum oxide and silicon oxide, and the layered polyester film has a plane orientation coefficient ΔP of not less than 0.005 and not more than 0.200, a film thickness of not thinner than 1 μm and not thicker than 300 μm, and an oxygen permeability of not less than 0.1 mL/m$^2$/day/MPa and not more than 80 mL/m$^2$/day/MPa under a temperature of 23° C. and a humidity of 65%.

It is preferable that the polyester film has a heat shrinkage rate of not less than 0.01% and not more than 30% when heated at 150° C. for 30 minutes. It is more preferable that the polyester film has a heat shrinkage rate of not less than 0.01% and not more than 20% when heated at 150° C. for 30 minutes. It is further preferable that the polyester film has a heat shrinkage rate of not less than 0.01% and not more than 10% when heated at 150° C. for 30 minutes.

It is preferable that the polyester film has a plane orientation coefficient ΔP of not less than 0.100 and not more than 0.200.

Advantageous Effects of Invention

The layered polyester film comprising a polyester film having a furandicarboxylic acid unit can be used preferably as industrial and packing films since the layered polyester film has excellent mechanical properties, transparency and heat resistance. According to further preferable embodiments, the present invention can provide a packing material or a gas shielding material which has strength and heat stability surprisingly as high as those of PET film, has gas shielding property extremely higher than that of PET film, and is usable for foodstuff, pharmaceutical products, electronic parts, and the like which are required to be in air-tightness.

DESCRIPTION OF EMBODIMENTS

The layered polyester film of the present invention contains a polyester film and a thin film layer including mainly an inorganic compound, and the thin film layer is formed on at least one surface of the polyester film.

<Polyester Film>

The polyester film used in the present invention is a biaxially oriented polyester film composed of a polyethylene furandicarboxylate-based resin including a dicarboxylic acid component containing mainly a furandicarboxylic acid and a glycol component containing mainly ethylene glycol. The polyethylene furandicarboxylate-based resin herein contains an ethylene glycol and a furandicarboxylic acid as main constituents. The term "mainly" refers to not less than 80% by mol of the furandicarboxylic acid in 100% by mol of all the dicarboxylic acid components and not less than 80% by mol of the ethylene glycol in 100% by mol of all the glycol components.

The other dicarboxylic acid component and the other glycol component may be copolymerized as long as the object of the present invention is not impaired. The amounts of those components to be copolymerized are each less than 20% by mol, preferably not more than 10% by mol, and more preferably not more than 5% by mol relative to the total dicarboxylic acid components or the total glycol components.

Examples of the other dicarboxylic acid component include aromatic dicarboxylic acids such as terephthalic acid, isophthalic acid, phthalic acid, naphthalenedicarboxylic acid, 4,4'-dicarboxybiphenyl and 5-sodiumsulfoisophthalic acid; alicyclic dicarboxylic acids such as 1,4-cyclohexanedicarboxylic acid, 1,3-cyclohexanedicarboxylic acid, 1,2-cyclohexanedicarboxylic acid, 2,5-norbornene dicarboxylic acid and tetrahydro phthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid and dimer acid.

Examples of the other glycol component include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethylol tricyclodecane, diethylene glycol and triethylene glycol; ethylene oxide adducts or propylene oxide adducts of bisphenol A, bisphenol S, bisphenol C, bisphenol Z, bisphenol AP and 4,4'-bisphenol; alicyclic glycols such as 1,2-cyclohexanedimethanol, 1,3-cyclohexanedimethanol and 1,4-cyclohexanedimethanol; polyethylene glycol; and polypropylene glycol.

As the polymerization method of the polyethylene furandicarboxylate-based resin, any production method is available such as a direct polymerization method in which furandicarboxylic acid and ethylene glycol, as well as, if necessary, the other dicarboxylic acid component and the other glycol component are allowed to directly react; and a transesterification method in which dimethylester of furandicarboxylic acid (if necessary, including the other methylester of dicarboxylic acid) and ethylene glycol (if necessary, including the other glycol component) are subjected to transesterification.

As the resin component of the polyester film used in the present invention, the other resin such as polyamide, polystyrene, polyolefin and polyesters other than the above may be contained. In terms of mechanical properties and heat resistance of the polyester film, it is preferable that the content of the other resin is not more than 30% by mass, further not more than 20% by mass, even further not more than 10% by mass, and especially not more than 5% by mass, relative to the total resin components of the polyester film, and it is most preferable that the content thereof is 0% by mass (the total resin components of the polyester film are substantially polyethylene furandicarboxylate-based resins).

The polyethylene furandicarboxylate-based resin has an intrinsic viscosity in the range of preferably not less than 0.30 dl/g and not more than 1.20 dl/g, more preferably not less than 0.55 dl/g and not more than 1.00 dl/g, and even more preferably not less than 0.70 dl/g and not more than 0.95 dl/g. When the intrinsic viscosity thereof is lower than 0.30 dl/g, the polyester film is likely to tear, and when it is higher than 1.20 dl/g, filtration pressure highly increases, making it difficult to achieve high-precision filtration, which in turn arises the difficulty of extruding the resin through the filter.

The polyester film resin has an intrinsic viscosity in the range of preferably not less than 0.30 dl/g and not more than 1.20 dl/g, more preferably not less than 0.55 dl/g and not more than 1.00 dl/g, and even more preferably not less than 0.70 dl/g and not more than 0.95 dl/g. When the intrinsic viscosity thereof is lower than 0.30 dl/g, the polyester film is likely to tear, and when it is higher than 1.20 dl/g, the effect of enhancing mechanical properties becomes saturated.

<Thin Film Layer>

The thin film layer used in the present invention includes an inorganic compound as a main component which is at least one of aluminum oxide and silicon oxide. The term "main component" herein means that the total amount of aluminum oxide and silicon oxide is over 50% by mass, preferably not less than 70% by mass, more preferably not less than 90% by mass, and most preferably 100% by mass (the component constituting the thin film layer does not contain any component other than aluminum oxide and silicon oxide), relative to 100% by mass of the component constituting the thin film layer. The aluminum oxide as employed herein is composed of at least one of various aluminum oxides such as AlO, $Al_2O$ and $Al_2O_3$, and it is possible to adjust the content of those various aluminum oxides according to the preparation conditions of the thin film layer. The silicon oxide is composed of at least one of various silicon oxides such as SiO, $SiO_2$ and $Si_3O_2$, and it is possible to adjust the content of those various silicon oxides according to the preparation conditions of the thin film layer. The aluminum oxide or the silicon oxide may contain a trace amount (at most 3% by mass relative to all the components) of other component in the component as long as the properties are not impaired.

The thickness of the thin film layer is not particularly limited and is preferably from 5 to 500 nm, more preferably from 10 to 200 nm, and even more preferably from 15 to 50 nm, in terms of gas barrier properties and flexibility of the film. When the film thickness is less than 5 nm, satisfactory gas barrier properties may not be achieved. On the other hand, even when the film thickness exceeds 500 nm, the effect of enhancing the gas barrier properties equivalent to such film thickness may not be obtained, which in turn becomes disadvantageous in terms of bending resistance and production cost.

<Properties of Layered Polyester Film>

The layered polyester film of the present invention has a plane orientation coefficient (ΔP) of not less than 0.005 and not more than 0.200, preferably not less than 0.020 and not more than 0.195, more preferably not less than 0.100 and not more than 0.195, even more preferably not less than 0.110 and not more than 0.195, still more preferably not less than 0.120 and not more than 0.195, even still more preferably not less than 0.130 and not more than 0.190, further more preferably not less than 0.135 and not more than 0.180, especially preferably not less than 0.140 and not more than 0.170, and most preferably not less than 0.145 and not more than 0.160. When the plane orientation coefficient (ΔP) is less than 0.005, the mechanical properties of the film are insufficient, which makes it difficult to perform downstream processes such as film printing and bag forming, and also breaks the film on a printer or a coater during the subsequent printing or coating step, which is therefore not preferable. In accordance with JIS K 7142-1996 5.1 (A method), a refractive index of a machine direction (MD direction) in the film plane (nx), a refractive index of a direction perpendicular thereto (TD direction) (ny) and a refractive index of a thickness direction (nz) are measured by an Abbe refractometer with sodium D line as the light source, and the plane orientation coefficient (ΔP) can be calculated by the following equation:

$$\Delta P=\{(nx+ny)-2nz\}/2$$

Even in the case where the thin film layer is provided on both surfaces of the film, the refractive indexes are measured in the same manner as above.

The layered polyester film of the present invention has a heat shrinkage rate, which is obtained when the film is heated at 150° C. for 30 minutes, (hereinafter simply referred to as heat shrinkage rate) in both the MD and TD directions of preferably not more than 50%, more preferably not more than 30%, even more preferably not more than 20%, still more preferably not more than 10%, especially preferably not more than 8% and most preferably not more than 4.5%. Higher heat shrinkage rate adversely generates color drift during printing and causes film elongation on a printer or a coater, thereby making it difficult to perform printing or coating, and also causing poor appearance due to film deformation under high heat. Therefore, the heat shrinkage rate is preferably low, and the lower limit thereof is believed to be 0.01% in terms of the production process.

In the present invention, the layered polyester film under a temperature of 23° C. and a humidity of 65% has a degree of oxygen permeability of not less than 0.1 $mL/m^2/day/MPa$ and not more than 80 $mL/m^2/day/MPa$, preferably not less than 0.1 $mL/m^2/day/MPa$ and not more than 50 $mL/m^2/day/MPa$, more preferably not less than 0.1 $mL/m^2/day/MPa$ and not more than 30 $mL/m^2/day/MPa$, and even more preferably not less than 0.1 $mL/m^2/day/MPa$ and not more than 10 $mL/m^2/day/MPa$. When the degree thereof exceeds 80 $mL/m^2/day/MPa$, substances may deteriorate or preservability of food may become poor due to the oxygen permeated through the film. Further, the lower limit thereof is believed to be 0.1 $mL/m^2/day/MPa$ in terms of the film production process.

It should be noted that it is possible to further improve the degree of oxygen permeability by applying a printing or coating method and a co-extruding or other method to the film.

In the present invention, the polyester film under a temperature of 37.8° C. and a humidity of 90% has a degree of water vapor permeability of preferably not less than 0.1 g/m²/day and not more than 20 g/m²/day, more preferably not more than 10 g/m²/day, more preferably not more than 8 g/m²/day, and even more preferably not more than 5 g/m²/day. When the degree thereof exceeds 20 g/m²/day, substances may deteriorate or preservability of food may become poor due to the water vapor permeated through the film. The lower limit thereof is believed to be 0.1 g/m²/day in terms of the film production process. It should be noted that it is possible to further improve the degree of water vapor permeability by applying a printing or coating method and a co-extruding or other method to the film.

The layered polyester film of the present invention has the properties in which polyester itself having a furandicarboxylic acid unit has a high oxygen barrier property (a low degree of oxygen permeability). However, by forming a polyester film satisfying the conditions of the stretching step to be described later, the oxygen barrier property is further enhanced.

The refractive indexes of the MD direction and the direction perpendicular thereto (TD direction) in the layered polyester film plane (nx) and (ny) are each preferably not less than 1.5700, more preferably not less than 1.6000, and even more preferably not less than 1.6200. When nx and ny are not less than 1.5700, the film breaking strength and the breaking elongation are sufficiently achieved, so that the mechanical properties of the film are satisfactory, which facilitates downstream processes such as film printing and bag forming, and also prevents the film from breaking on a printer or a coater during the subsequent printing or coating step, which is therefore preferable. The value of nx and ny are believed to be less than 1.7000 in terms of the production process and the heat shrinkage rate.

The layered polyester film of the present invention has a breaking strength of both the MD and TD directions of preferably not less than 75 MPa. The lower limit of the breaking strength thereof is preferably 100 MPa, more preferably 150 MPa, even more preferably 200 MPa, and still more preferably 220 MPa. When the breaking strength is less than 75 MPa, the mechanical strength of the film is insufficient, so that problems such as unnecessary stretch and deviation are likely to occur during the film processing step, which is therefore not preferable. In view of the production process, the upper limit of the breaking strength is 1000 MPa.

The layered polyester film of the present invention has a breaking elongation of both the MD and TD directions of preferably not less than 10%. The lower limit of the breaking elongation thereof is preferably 15%, more preferably 20%, and especially preferably 30%. When the breaking elongation is less than 10%, the mechanical elongation of the film is insufficient, so that problems such as cracking and breaking are likely to occur during the film processing step, which is therefore not preferable. In view of the production process, the upper limit of the breaking elongation is 300%. The upper limit thereof is preferably 150%, more preferably 100%, and even more preferably 80%.

The layered polyester film of the present invention has a total light transmittance of preferably not less than 75%. To improve detection accuracy of internal foreign matters, which is a film defect, the film desirably has high transparency. Therefore, the layered polyester film of the present invention has a total light transmittance of preferably not less than 75%, more preferably not less than 80%, even more preferably not less than 88.5%, and especially preferably not less than 89%. To improve such detection accuracy, the higher the total light transmittance is, the more preferable it is. It is, however, technically difficult to achieve a total light transmittance of 100%.

The layered polyester film of the present invention has a haze of preferably not more than 15%. To detect defects of the contents for food packaging applications, it is desirable that the film is less cloudy. Therefore, the haze of the layered polyester film of the present invention is preferably not more than 15%, more preferably not more than 8%, even more preferably not more than 3%, and especially preferably not more than 1%. Although the lower haze is preferable, the lower limit of the haze appears to be 0.1% in view of the specific refractive index of the polyester film having a furandicarboxylic acid unit.

The layered polyester film of the present invention has a thickness of not less than 1 μm and not more than 300 μm, preferably not less than 5 μm and not more than 200 μm, more preferably not less than 10 μm and not more than 100 μm, and especially not less than 10 μm and not more than 40 μm. When the thickness thereof exceeds 300 μm, a cost problem arises, and the use of the film as a packaging material is likely to cause lower visibility. When such thickness does not reach 1 μm, the mechanical properties are degraded, so that the layered polyester film may fail to function as a film.

A method for producing the layered polyester film of the present invention will be explained. A representative example of the method using PEF pellets is explained in detail, but, as a matter of course, not limited thereto.

First, film raw materials are subjected to drying or hot-air drying so as to have a water content of less than 200 ppm. The raw materials are then each weighed and mixed. The mixture is fed into an extruder and melt-extruded into a sheet shape. The sheet in a molten state is brought into contact with a rotating metal roll (a casting roll) using an electrostatic application method, and then cooled to be solidified, so that an unstretched PEF sheet is obtained.

The molten resin can be subjected to high-precision filtration at any location where the molten resin is kept at a temperature from 220 to 280° C. in order to remove foreign matters contained in the resin. The filter medium used for the high-precision filtration of molten resin is not particularly limited, and a sintered stainless steel body is suitable for the filter medium because the sintered stainless steel body has an excellent performance in removing aggregates mainly containing Si, Ti, Sb, Ge and Cu, and organic substances having a high melting point.

When a surface layer (layer a) and an intermediate layer (layer b) are co-extruded and layered each other, the raw materials in these layers are extruded using two or more extruders, and both the layers are merged using a multilayered feed block (e.g., a merging block having a square merging section). The merged layers are extruded into a sheet-like shape from a slit die, and the extruded sheet is cooled to be solidified on the casting roll, so that an unstretched film is produced. Alternatively, a multi-manifold die may be used instead of the multilayered feed block.

Next, the unstretched film obtained by the above-mentioned method is biaxially stretched, followed by heat treatment.

For example, when a biaxially oriented polyester film having a furandicarboxylic acid unit is produced, a successive biaxially stretching method in which a film is uniaxially stretched in the MD direction or the TD direction and then successively stretched in a direction perpendicular thereto; a simultaneous biaxially stretching method in which a film is stretched simultaneously in the MD direction and the TD direction; and a method using a linear motor drive during the simultaneous biaxially stretching may be adopted. In the case of the successive biaxially stretching method, the MD stretching allows a film to be stretched in the MD direction by providing a difference in speed using a heating roll. An infrared heater may be used together for the heating. Subsequent TD stretching allows the MD stretched sheet to be stretched in the TD direction by introducing the sheet into a tenter, holding both ends of the sheet with a clip and then heating the sheet. The TD-stretched film is successively subjected to heat treatment in the tenter. The heat treatment may be performed while the film is being stretched for the TD stretching or while the film is being relaxed in the TD direction. The heat-treated film may also have both ends cut away and then wound up with a winder.

Patent Documents 5 and 6 disclose the method for producing a PEF, PEF derivative film obtained by uniaxially stretching at 1.6 to 16 times. The method disclosed above, however, cannot achieve the mechanical properties available for industrial and packaging uses. As a result of intensive studies, the present inventors have accomplished high mechanical properties by performing the following stretching methods (i) to (vii). Moreover, high barrier properties have been accomplished by preparing a thin film layer as described in (viii) below.

(i) Control of Stretching Ratio of MD Direction of Film

To obtain the polyester film used in the present invention, the film is desirably stretched in the MD direction at a stretching ratio in the range of 1.1 to 10.0 times. When the film is stretched in the MD direction at a stretching ratio of not less than 1.1 times (preferably not less than 1.5 times), a film having a plane orientation coefficient $\Delta P$ of not less than 0.005 can be prepared. The stretching ratio of MD direction is preferably not less than 2.5 times, more preferably not less than 3.5 times, even more preferably not less than 4.0 times, and especially preferably not less than 4.5 times. When the stretching ratio is not less than 2.5 times, the coefficient $\Delta P$ is not less than 0.02, and the refractive indexes in the MD and TD directions, nx and ny, are not less than 1.5700, thereby producing a film having excellent dynamic properties including a film breaking strength of not less than 100 MPa and a film breaking elongation of not less than 15%. When the stretching ratio of MD direction is not more than 10.0 times, the breaking frequency decreases, which is preferable. By increasing the stretching ratio of MD direction and properly orienting the molecular chain, it is possible to increase the temperature in the heat fixation step and to lower the heat shrinkage rate.

(ii) Control of Temperature During Stretching MD Direction of Film

To obtain the polyester film used in the present invention, the film is desirably stretched in the MD direction at a temperature in the range of not less than 90° C. and not more than 150° C. More preferably, the temperature is not less than 100° C. and not more than 125° C. When the temperature during stretching in the MD direction is not less than 90° C., the breaking frequency decreases, which is preferable. When the temperature is not more than 150° C., it is possible to uniformly stretch the film, which is preferable.

(iii) Control of Stretching Ratio of TD Direction of Film

To obtain the polyester film used in the present invention, the film is desirably stretched in the TD direction at a stretching ratio in the range of 1.1 to 10 times. When the film is stretched in the TD direction at a stretching ratio of not less than 1.1 times (preferably not less than 1.5 times), a film having a plane orientation coefficient $\Delta P$ exceeding 0.005 can be prepared. The stretching ratio of TD direction is preferably not less than 3.0 times, more preferably not less than 3.5 times, even more preferably not less than 4.0 times, and especially preferably not less than 4.5 times. When the stretching ratio of TD direction is not less than 3.0 times, the coefficient $\Delta P$ is not less than 0.02, and the refractive indexes in the MD and TD directions, nx and ny, are not less than 1.5700, thereby producing a film having excellent dynamic properties including a film breaking strength of not less than 75 MPa and a film breaking elongation of not less than 15%. When the stretching ratio of TD direction is not more than 10.0 times, the breaking frequency decreases, which is preferable.

(iv) Control of Temperature During Stretching TD Direction

To obtain the polyester film used in the present invention, the film is desirably stretched in the TD direction at a temperature in the range of not less than 80° C. and not more than 200° C. More preferably, the temperature is not less than 95° C. and not more than 135° C. When the temperature during stretching in the TD direction is not less than 80° C., the breaking frequency decreases, which is preferable. When the temperature is not more than 200° C., it is possible to uniformly stretch the film, which is preferable.

(v) Control of Heat Fixation Temperature of Film

To obtain the polyester film used in the present invention, the film is preferably subjected to heat fixation at a temperature in the range of not less than 110° C. and not more than 220° C. When the heat fixation temperature is not more than 220° C. (preferably not more than 210° C.), the film hardly becomes opaque, the frequency of melt breaking decreases, which is preferable. It is preferable that higher heat fixation temperature reduces the heat shrinkage rate, so that the heat fixation temperature is preferably not less than 120° C., more preferably not less than 140° C., even more preferably not less than 160° C., especially preferably not less than 175° C. and most preferably not less than 185° C. The plane orientation coefficient $\Delta P$ tends to increase due to the heat fixation treatment.

(vi) Control of Temperature During TD Relaxation Treatment

To obtain the polyester film used in the present invention, the film is desirably subjected to relaxation treatment in the TD direction at a temperature in the range of not less than 100° C. and not more than 200° C. The temperature during the relaxation treatment in the TD direction is preferably not less than 165° C. and not more than 195° C., and more preferably not less than 175° C. and not more than 195° C. This can reduce the heat shrinkage rate, which is desirable.

(vii) Control of Relaxation Ratio During TD Relaxation Treatment

To obtain the polyester film used in the present invention, the film is desirably subjected to relaxation treatment in the TD direction at a relaxation ratio in the range of not less than 0.5% and not more than 10.0%. The relaxation ratio during the relaxation treatment in the TD direction is preferably not less than 2% and not more than 6%. This can reduce the heat shrinkage rate, which is desirable.

(viii) Method for Preparing Thin Film Layer

A known method such as a PVD method (a physical vapor deposition method) including a vacuum deposition method, a sputtering method and ion plating, or a CVD method (a chemical vapor deposition method) is appropriately used to prepare a thin film layer. A physical vapor deposition method is preferable and in particular, a vacuum deposition method is more preferable. For example, in the vacuum deposition method, a mixture of $Al_2O_3$ and $SiO_2$ or a mixture of Al and $SiO_2$ as a deposition source material is used. As a heating method, resistance heating, high-frequency induction heating, electron beam heating or the like may be used. As a reactive gas, oxygen, nitrogen, water vapor or the like may be introduced, and reactive deposition using a means such as ozone adding and ion assist may be used. In addition, the preparation conditions may be changed such as adding a bias or the like on the substrate; increasing the substrate temperature; or cooling, as long as the object of the present invention is not impaired. The same applies to the other preparation method such as a sputtering method or a CVD method.

The polyester film used in the present invention is produced by a method for producing a polyester film comprising a stretching step in which an unstretched film is stretched in a machine direction and a direction perpendicular to the machine direction to thereby obtain a stretched film; and a relaxation step in which the stretched film is relaxed, but the production method is not limited to the one specifically disclosed above as long as it does not depart from the scope and spirit of the invention. It is essential in the production of the film of the present invention to control the above-mentioned production conditions in a very narrow range with high precision based on the scope and spirit of the invention.

In the polyester film used in the present invention, the breaking strength, breaking elongation and heat shrinkage rate of the film allow the above-mentioned stretching and heat treatment conditions to be controlled independently and in combination. These may be optionally selected, and by combining the above methods (i) to (vii) as preferable conditions, it is possible to produce a film having a plane orientation coefficient ΔP of not less than 0.100 (preferably not less than 0.140), a heat shrinkage rate of not more than 8% (preferably not more than 4.5%), a breaking strength of not less than 150 MPa (more preferably not less than 250 MPa) and a breaking elongation of not less than 40%.

For example, it is effective to increase the stretching ratio of MD direction and the stretching ratio of TD direction and to perform the heat fixation treatment at higher temperature in order to obtain a film having a heat shrinkage rate of not more than 8% and a film breaking strength of not less than 150 MPa. Specifically, by setting the stretching ratio of MD direction to not less than 4.0 times (preferably not less than 4.5 times), setting the stretching ratio of TD direction to not less than 4.0 times (preferably not less than 4.5 times), and setting the heat fixation temperature to not less than 165° C., it is possible to produce a film having a breaking strength of not less than 150 MPa, a heat shrinkage rate of not more than 8%, a plane orientation coefficient (ΔP) of not less than 0.100.

Further, by combining a thin film layer obtained by the above production method (viii) with the polyester film described above on the stretched film thus prepared, it is possible to obtain a layered polyester film having a degree of oxygen permeability from 0.1 to 80 mL/m²/day/MPa under a temperature of 23° C. and a humidity of 65%.

It is also possible to perform corona treatment or plasma treatment during the step of stretching this film, or after the completion of the stretching. In addition, it is possible to impart sliding properties, antiblocking properties, antistatic properties, easy adhesive properties and the like to the film by coating the film with a solution or a dispersion in which a resin, a crosslinking agent and particles are properly mixed and then solved with a solvent. Further, various stabilizers, a pigment, a UV absorbing agent or the like may be added in the film of the present invention.

Further, it is possible to enhance the function of the film by surface-treating the film after the completion of stretching and heat treatment. Examples of the surface treatment include printing and coating.

The film after the completion of stretching and heat treatment and the surface-treated film can be used for a packaging body, a label, a design sheet, or the like by laminating paper.

The present application claims the benefit of priority to Japanese Patent Application Number 2015-257295 filed on Dec. 28, 2015. The entire contents of the specifications of Japanese Patent Application Number 2015-257295 filed on Dec. 28, 2015 are hereby incorporated by reference.

EXAMPLES

Next, the effects of the present invention will be explained with reference to Examples and Comparative Examples. First, methods for evaluating property values used in the present invention will be described as follows. In (1) to (6) and (8) to (10), various physical properties were measured for layered polyester films in Examples and various physical properties were measured for polyester films in Comparative Examples.

(1) Breaking Strength and Breaking Elongation

Samples each in a strip form of 140 mm length and 10 mm width were cut out in the MD direction and TD direction of each film by a cutter. Next, each strip form sample was pulled by Autograph AG-IS (manufactured by Shimadzu Corporation) to measure the breaking strength (MPa) and the breaking elongation (%) in the respective directions from the load-strain curve obtained.

The measurement was performed under conditions of an atmosphere of 25° C., a chuck distance of 40 mm, a crosshead speed of 100 mm/minute, and a load cell of 1 kN. The measurement was repeated 5 times and the estimation was done using the average value thereof.

(2) Plane Orientation Coefficient (ΔP)

The plane orientation coefficient was calculated as follows: the refractive index (nx) in the MD direction of the film plane of the polyester film as well as the refractive index (ny) in the direction orthogonal to the MD direction and the refractive index (nz) in the thickness direction were measured in accordance with JIS K 7142-1996 5.1 (method A) using Abbe refractometer in which a light source is a sodium D line, and the plane orientation coefficient (ΔP) was calculated based on the following equation:

$$\Delta P = \{(nx+ny)-2nz\}/2.$$

Methylene iodide was used as a contact liquid.

In the case that a thin layer was provided on one surface, a plane orientation coefficient of the opposite side surface of the thin layer was measured three times, an average value thereof was made to a plane orientation coefficient (ΔP).

In the case that thin layers were provided on both surface, a plane orientation coefficient of the surface of the thin layer is measured three times, an average value thereof was made to a plane orientation coefficient (ΔP).

(3) Total Light Transmittance and Haze

The measurement was performed in accordance with JIS K 7136 "Plastics: Method of Determining Haze of Transparent Materials". A NDH-5000 model turbidity meter manufactured by NIPPON DENSHOKU INDUSTRIES Co., Ltd. was used as a measurement meter.

(4) Heat Shrinkage (Heat Shrinkage in MD Direction and TD Direction)

Each film was cut out in a size of 10 mm width and 250 mm length to the direction for the measurement and marked at every 150 mm interval. The intervals (A) between marks were measured under a constant tension of 5 gf. Next, each film was put in an oven in an atmosphere of 150° C. and subjected to a heat treatment at 150±3° C. for 30 minutes without load. Thereafter, the intervals (B) between marks were measured under a constant tension of 5 gf. The heat shrinkage was calculated based on the following equation:

Heat shrinkage (%)={($A-B$)/$A$}×100.

(5) Oxygen Permeability

The measurement was performed in accordance with JIS K 7126-2A using an oxygen permeability measurement apparatus (OX-TRAN2/21, manufactured by MOCON Inc.) under conditions of a temperature of 23° C. and a humidity of 65%. An opposite surface of thin layer was mounted to be a humidity control side.

(6) Water Vapor Permeability

The measurement was performed in accordance with JIS K 7129B using a water vapor permeability measurement apparatus (PERMATRAN-W3/33, manufactured by MOCON Inc.) under conditions of a temperature of 37.8° C. and a humidity of 90%. An opposite surface of thin layer was mounted to be a high humidity side.

(7) Intrinsic Viscosity (IV)

After crushed and dried, each polyester resin was dissolved in a mixed solvent of para-chlorophenol and tetrachloroethane (75/25 in weight ratio). The flow time of each solution having a concentration of 0.4 g/dl and the flow time of the solvent alone were measured using an Ubbelohde viscometer at 30° C., and their time ratio was employed to calculate intrinsic viscosity of the polyester resin according to Huggins' expression, assuming that the Huggins' constant was 0.38.

(8) Film Thickness

Four 5 cm-square samples were cut out from arbitrary 4 positions of each film to be measured and subjected to thickness measurement at 5 points of each sample (20 points in total) by using Millitron. The average value thereof was employed as film thickness.

(9) Oxygen Permeability Test for Packing Container
i) Production of Coloring Solution A glass container was loaded with 2 L of water and 6.6 g of powdered agar and put in hot water at 95° C. and heated for not shorter than 1 hour to completely dissolve the agar. The solution was filtered using a 50 mesh metal net to remove the gelled foreign matters. The solution was mixed with 0.04 g of methylene blue. The solution was further evenly mixed with 1.25 g of sodium hydrosulfide in a glove box in which nitrogen has previously been allowed to flow through for not shorter than 15 minutes to obtain a coloring solution (colorless).

ii) Production of Packing Container for Film

After a polyester type adhesive was applied to each layered polyester film produced in Examples or each polyester film produced in Comparative Examples, a linear low density polyethylene film having a thickness of 40 μm (LLDPE film: L4102, manufactured by Toyobo Co., Ltd.) was dry-laminated, and the resultant film was aged in an environment of 40° C. for 3 days to obtain a laminate film. This laminate film was used to produce a three sides-sealed bag having an inner dimension of 70 mm width×105 mm height.

iii) Charge with Coloring Solution

The three sides-sealed bag was charged with about 30 mL of the coloring solution in the glove box in which nitrogen has previously been allowed to flow through for not shorter than 15 minutes. The three sides-sealed bag was filled with nitrogen and thereafter closed with a sealer, so that a packing container filled with the coloring solution can be obtained.

iv) Oxygen Permeability Test

After the agar was solidified at room temperature, the packing container filled with the coloring solution was transferred to a thermostatic chamber at 40° C. and color change was observed after 72 hours. The color change was determined according to the following standard, and those marked with A were regarded as acceptable.

A: Almost no color change
B: Significant color change

(10) Heat Resistance Test for Layered Polyester Film

Each film sample in a size of 100 mm length×100 mm width was made available by cutting the layered polyester film. Each film sample was put in an oven heated to 130° C. for 5 minutes and its appearance change was observed. The appearance change was evaluated according the following standard, and those marked with A, B and C were regarded as acceptable.

A: Almost no appearance change
B: Generally equivalent to the level of A, but deformation is observed only in film ends
C: Slight appearance change
D: Significant appearance change

(11) Composition and Thickness of Thin Film Layer

The film composition of an inorganic compound was determined using a fluorescent X-ray analysis apparatus (ZSX 100 e, manufactured by Rigaku) based on a calibration curve prepared previously. The condition for the excitation X-ray tube was 50 kV and 70 mA.

The calibration curve was determined by the following procedure.

A plurality of types of films each having an inorganic compound thin film composed of aluminum oxide and silicon oxide were produced, and the deposition amount of aluminum oxide and that of silicon oxide were determined respectively by inductively coupled plasma emission method (ICP method). Next, each film for which the deposition amounts were determined was analyzed by a fluorescent X-ray analysis apparatus (ZSX 100 e, manufactured by Rigaku; condition for excitation X-ray tube: 50 kV and 70 mA) to determine the fluorescent X-ray intensity for aluminum oxide and silicon oxide of each sample. The calibration curve was prepared from the relation of the fluorescent X-ray intensity and the deposition amount determined by ICP.

The deposition amount determined by ICP was expressed by basically mass unit, and therefore the mass unit was converted as follows so as to obtain film composition.

The film thickness was calculated while the inorganic oxide thin film was assumed to have a bulky density of 80% and aluminum oxide and silicon oxide were assumed to have respective volumes even in mixed state.

The content wa (% by mass) of aluminum oxide in the film and the content ws (% by mass) of silicon oxide in the film are calculated from the following equations (1) and (2) in which Ma (g/cm²) is defined as the deposition amount of aluminum oxide per unit area and Ms (g/cm²) is defined as the deposition amount of silicon oxide per unit area.

$$wa=100\times[Ma/(Ma+Ms)] \quad (1)$$

$$ws=100-wa \quad (2)$$

Specifically, if the deposition amount of aluminum oxide per unit area is defined as Ma (g/cm$^2$), its bulk density is defined as ρa (3.97 g/cm$^3$), the deposition amount of silicon oxide per unit area is defined as Ms (g/cm$^2$), and its bulk density is defined as ρs (2.65 g/cm$^3$), the film thickness t (nm) is calculated from the following formula (3).

$$t=(Ma/(\rho a \times 0.8)+Ms/(\rho s \times 0.8))\times 10^7 \text{ formula} \quad (3)$$

The film thickness value determined by fluorescent X-ray analysis apparatus was close to the film thickness determined actually by TEM.

Comparative Example 1

As a raw material, polyethylene 2,5-furandicarboxylate manufactured by Avantium, IV=0.90 was used. The raw material was vacuum-dried (at 1 Torr) at 100° C. for 24 hours, and thereafter fed into a biaxial extruder (a screw diameter of 30 mm, L/D=25). The raw material fed into the biaxial extruder was melt-extruded into a sheet-like shape from a T die (a cap) at a resin temperature of a molten section, a kneading section, piping and a gear pump in the extruder of 270° C. and at a temperature of the subsequent piping of 275° C.

The extruded resin was casted on a cooling drum having a surface temperature of 20° C., the casted resin was brought into contact with the surface of the cooling drum using an electrostatic application method, and the resin in contact was then cooled to be solidified, so that an unstretched film having a thickness of 250 μm was prepared.

The temperature of the film was increased with a set of rolls having a temperature heated to 120° C. and the unstretched sheet thus prepared was thereafter stretched 5 times in the MD direction with a set of rolls having different peripheral speeds.

Next, the uniaxially stretched film thus obtained was introduced into a tenter, held with a clip and then stretched in the TD direction. The conveying speed was 5 m/min. The temperature during stretching TD direction was 105° C. and the stretching ratio of TD direction was 5 times. The stretched film was subsequently subjected to heat treatment at 200° C. for 12 seconds, and then subjected to 5% relaxation treatment at 190° C., to thereby prepare a polyester film having a furandicarboxylic acid unit. The properties of the resulting film are shown in Table 2.

The properties of the polyester film, which was obtained by stretching the film 5 times in the MD direction at a temperature during stretching MD direction of 120° C. and stretching the film 5 times in the TD direction at a temperature during stretching TD direction of 105° C. to increase the heat fixation temperature to 200° C., included a heat shrinkage rate of 3.3% in the MD direction and 4.3% in the TD direction; a breaking strength of 275 MPa in the MD direction and 252 MPa in the TD direction; and a plane orientation coefficient (ΔP) of 0.143. Since the film in Comparative Example 1 had a high oxygen transmittance degree of not more than 107 mL/m$^2$/day/MPa, the gas barrier properties were insufficient.

Comparative Example 2

A polyester film was obtained in the same manner as described in Comparative Example 1, except that the thickness of the unstretched film was 300 μm. The properties of the resulting film are shown in Table 2.

Comparative Examples 3 to 6

A polyester film was obtained in the same manner as described in Comparative Example 1, except that the film forming conditions of the polyester film were changed to those shown in Table 2. The properties of the resulting film are shown in Table 2.

Comparative Example 7

A polyester film was obtained in the same manner as described in Comparative Example 1, except that a raw material obtained by dry blending poly(ethylene 2,5-furandicarboxylate) manufactured by Avantium, IV=0.80 and poly(ethylene 2,5-furandicarboxylate) manufactured by Avantium, IV=0.70 at a 50 to 50 ratio was used, and the film forming conditions of the polyester film were changed to those shown in Table 2. The properties of the resulting film are shown in Table 2.

The properties of the polyester film, which was obtained by stretching the film 2.5 times in the MD direction at a temperature during stretching MD direction of 95° C. and stretching the film 3 times in the TD direction at a temperature during stretching TD direction of 85° C. to increase the heat fixation temperature to 120° C., included a heat shrinkage rate at 150° C. for 30 minutes of 21% in the MD direction and 27% in the TD direction; a breaking strength of 94 MPa in the MD direction and 134 MPa in the TD direction; and a plane orientation coefficient (ΔP) of 0.0235. Since the film in Comparative Example 7 had a high oxygen transmittance degree of not more than 121 mL/m$^2$/day/MPa, the gas barrier properties were insufficient.

Comparative Example 8

Although the film was stretched in the same manner as in Comparative Example 7, except that only the heat fixation temperature was changed to 200° C. and the temperature during TD relaxation treatment was changed to 190° C., the film was broken in the heat fixation step, failing to obtain a stretched film. In the case where the stretching ratio of MD direction was 2.5 times and the stretching ratio of TD direction was 3.0 times, the film did not withstand at a heat fixation temperature of 200° C., resulting in breaking of the film.

Comparative Example 9

Although a polyester film was attempted to be formed in the same manner as described in Comparative Example 1, except that the film forming conditions of the polyester film were changed to those shown in Table 2, the film was broken in the heat fixation step, failing to obtain a stretched film. In the case where the stretching ratio of MD direction was 3.4 times and the stretching ratio of TD direction was 4.0 times, the film did not withstand at a heat fixation temperature of 200° C., resulting in breaking of the film.

Example 1

Particulate Al$_2$O$_3$ (a purity of 99.5%) and SiO$_2$ (a purity of 99.9%) having a size of 3 to 5 mm were used as deposition sources, and Al$_2$O$_3$ and SiO$_2$ were simultaneously deposited on the polyester film obtained in Comparative Example 1 by an electron-beam deposition method, so that an Al$_2$O$_3$—SiO$_2$ based thin film layer was formed. As the deposition material, a circular crucible having a diameter of 40 mm was divided into two sections with a carbon plate, and these sections were each charged with a particulate Al$_2$O$_3$ and a particulate SiO$_2$ without mixing. The polyester film having the furandicarboxylic acid unit mentioned above was placed on a support plate. An electron gun was used as a heating source, and the $Al_2O_3$ and the $SiO_2$ were heated by irradiating in time division with an electron beam. The $Al_2O_3$ and the $SiO_2$ were heated and vaporized on the surface of the polyester film having the furandicarboxylic acid unit, and then mixed to be deposited thereon. At that time, the electron gun had an emission current of 205 mA and an acceleration voltage of 6 kV, and an electric power equivalent to 160 mA×6 kV was supplied to the aluminum oxide charged in the crucible and an electric power equivalent to 45 mA×6 kV was supplied to the silicon oxide charged therein. The vacuum pressure during the deposition was $1.1 \times 10^{-4}$ Pa and the film support body had a temperature of 23° C. By changing the film forming speed, the thin film layer was deposited so as to have a thickness of about 20 nm using a quartz oscillator-type film thickness measuring device, so that a layered polyester film was obtained. The properties of the resulting film are shown in Table 1.

The film was stretched 5 times in the MD direction at a temperature during stretching MD direction of 120° C., and was then stretched 5 times in the TD direction at a temperature during stretching TD direction of 105° C., which enabled the heat fixation temperature to increase to 200° C. The properties of the layered polyester film thus obtained included a thickness of 12 μm; a heat shrinkage rate of 3.1% in the MD direction and 4.1% in the TD direction; a breaking strength of 287 MPa in the MD direction and 251 MPa in the TD direction; a plane orientation coefficient (ΔP) of 0.146; and a degree of oxygen permeability of 7.6 mL/m²/day/MPa. Therefore, a layered polyester film having excellent mechanical properties, transparency and heat resistance as well as having particularly excellent gas barrier properties can be obtained.

Example 2

A layered polyester film was obtained in the same manner as described in Example 1, except that the polyester film was changed to the polyester film obtained in Comparative Example 2. The properties of the resulting film are shown in Table 1.

The film was stretched 5 times in the MD direction at a temperature during stretching MD direction of 120° C., and was then stretched 5 times in the TD direction at a temperature during stretching TD direction of 105° C., which enabled the heat fixation temperature to increase to 200° C. The properties of the layered polyester film thus obtained included a thickness of 15.5 μm; a heat shrinkage rate of 4.1% in the MD direction and 3.9% in the TD direction; a breaking strength of 263 MPa in the MD direction and 258 MPa in the TD direction; and a plane orientation coefficient (ΔP) of 0.148; and a degree of oxygen permeability of 7.8 mL/m²/day/MPa. Therefore, a layered polyester film having excellent mechanical properties, transparency and heat resistance as well as having particularly excellent gas barrier properties can be obtained.

Examples 3 to 6

A layered polyester film was obtained in the same manner as described in Example 2, except that the deposition conditions such as current, electric power and film forming speed were changed in order to change the thickness and composition of the thin film layer to those shown in Table 1. The properties of the resulting film are shown in Table 1.

Examples 7 to 10

A layered polyester film was obtained in the same manner as described in Example 1, except that the film forming conditions of the polyester film to be applied for the deposition were changed to those shown in Table 1. The properties of the resulting film are shown in Table 1.

Example 11

A layered polyester film was obtained in the same manner as described in Example 1, except that the polyester film was changed to the polyester film obtained in Comparative Example 7. The properties of the resulting film are shown in Table 1.

TABLE 1

| Item | | | Example 1 | Example 2 | Example 3 | Example 4 | Example 5 | Example 6 |
|---|---|---|---|---|---|---|---|---|
| Intrinsic Viscosity | | (dL/g) | 0.7 | 0.7 | 0.7 | 07 | 0.7 | 07 |
| Production Condition of Polyester Film | Stretching Ratio of MD Direction | (—) | 5 | 5 | 5 | 5 | 5 | 5 |
| | Temperature during Stretching MD Direction | (° C.) | 120 | 120 | 120 | 120 | 120 | 120 |
| | Stretching Ratio of TD Direction | (—) | 5 | 5 | 5 | 5 | 5 | 5 |
| | Temperature during Stretching TD Direction | (° C.) | 105 | 105 | 105 | 105 | 105 | 105 |
| | Heat Fixation Temperature | (° C.) | 200 | 200 | 200 | 200 | 200 | 200 |
| | Relaxation Ratio during TD Relaxation Treatment | (%) | 5 | 5 | 5 | 5 | 5 | 5 |
| | Temperature during TD Relaxation Treatment | (° C.) | 190 | 190 | 190 | 190 | 190 | 190 |
| Layered Polyester Film | Breaking Strength | MD (MPa) | 287 | 263 | 260 | 260 | 260 | 260 |
| | | TD (MPa) | 251 | 258 | 255 | 255 | 255 | 255 |
| | Breaking Elongation | MD (%) | 44 | 45 | 46 | 49 | 47 | 46 |
| | | TD (%) | 45 | 41 | 42 | 44 | 43 | 42 |
| | Refractive Index | Nx (—) | 1.6317 | 1.6317 | 1.6285 | 1.6295 | 1.6292 | 1.6292 |
| | | Ny (—) | 1.6219 | 1.6269 | 1.6241 | 1.6242 | 1.6237 | 1.6242 |
| | | Nz (—) | 1.4812 | 1.4810 | 1.4802 | 1.4804 | 1.4801 | 1.4811 |
| | Plane Orientation Coefficient(ΔP) | (—) | 0.146 | 0.148 | 0.146 | 0.146 | 0.146 | 0.146 |
| | Heat Shrinkage Rate | MD (%) | 3.1 | 4.1 | 4.3 | 4.3 | 4.3 | 4.3 |
| | | TD (%) | 4.1 | 3.9 | 4.3 | 4.3 | 4.3 | 4.3 |
| | Haze | (%) | 0.33 | 0.41 | 0.3 | 0.3 | 0.3 | 0.3 |
| | Total Light Transmittance | (%) | 89.3 | 89.1 | 89.1 | 89.1 | 89.1 | 89.1 |
| | Thickness | (μm) | 12 | 15.5 | 15.5 | 15.5 | 15.5 | 15.5 |

TABLE 1-continued

| | Item | | | | | | | | |
|---|---|---|---|---|---|---|---|---|---|
| Thin Film Layer | Oxygen Permeability | (mL/m²day/MPa) | 7.6 | 7.3 | 8.1 | 7.7 | 7.7 | 8.1 |
| | Water Vapor Permeability | (g/m²/day) | 2.0 | 1.0 | 2.2 | 1.5 | 2.2 | 3.8 |
| | Thickness | (nm) | 20.4 | 19.9 | 16.0 | 30.0 | 20.1 | 19.9 |
| | Ratio of Al₂O₃ | (%) | 51.7 | 50.1 | 51.2 | 50.9 | 41.0 | 31.0 |
| | Ratio of SiO₂ | (%) | 48.3 | 49.9 | 48.8 | 49.1 | 59.0 | 69.0 |
| Oxygen Permeability Test for Packing Container | | | A | A | A | A | A | A |
| Heat Resistance Test for Layered Polyester Film | | | A | A | A | A | A | A |

| | Item | | | Example 7 | Example 8 | Example 9 | Example 10 | Example 11 |
|---|---|---|---|---|---|---|---|---|
| | Intrinsic Viscosity | | (dL/g) | 0.7 | 07 | 07 | 0.7 | 0.5 |
| Production Condition of Polyester Film | Stretching Ratio of MD Direction | | (—) | 5 | 5 | 4 | 5 | 2.5 |
| | Temperature during Stretching MD Direction | | (° C.) | 120 | 120 | 110 | 110 | 95 |
| | Stretching Ratio of TD Direction | | (—) | 5 | 5 | 4 | 4 | 3 |
| | Temperature during Stretching TD Direction | | (° C.) | 105 | 105 | 105 | 105 | 85 |
| | Heat Fixation Temperature | | (° C.) | 180 | 140 | 120 | 120 | 120 |
| | Relaxation Ratio during TD Relaxation Treatment | | (%) | 5 | 5 | 5 | 5 | 1 |
| | Temperature during TD Relaxation Treatment | | (° C.) | 170 | 130 | 110 | 110 | 110 |
| Layered Polyester Film | Breaking Strength | MD | (MPa) | 215 | 209 | 190 | 310 | 94 |
| | | TD | (MPa) | 218 | 225 | 195 | 258 | 134 |
| | Breaking Elongation | MD | (%) | 27 | 31 | 64 | 38 | 11 |
| | | TD | (%) | 31 | 26 | 64 | 47 | 69 |
| | Refractive Index | Nx | (—) | 1.6314 | 1.6231 | 1.5762 | 1.6175 | 1.5652 |
| | | Ny | (—) | 1.6205 | 1.6193 | 1.5702 | 1.6035 | 1.5782 |
| | | Nz | (—) | 1.4835 | 1.4822 | 1.5451 | 1.4834 | 1.5478 |
| | Plane Orientation Coefficient(⊿P) | | (—) | 0.142 | 0.139 | 0.028 | 0.127 | 0.024 |
| | Heat Shrinkage Rate | MD | (%) | 5.5 | 22 | 29 | 29 | 21 |
| | | TD | (%) | 7.1 | 28.1 | 36 | 49 | 27 |
| | Haze | | (%) | 0.25 | 0.17 | 2.9 | 1.3 | 0.78 |
| | Total Light Transmittance | | (%) | 89 | 89.2 | 90.4 | 89.8 | 89.9 |
| | Thickness | | (μm) | 11.9 | 11.6 | 19.2 | 19.5 | 18.8 |
| | Oxygen Permeability | | (mL/m²day/MPa) | 8.0 | 8.5 | 8.5 | 8.4 | 9.2 |
| | Water Vapor Permeability | | (g/m²/day) | 2.0 | 2.1 | 2.1 | 2.1 | 2.2 |
| Thin Film Layer | Thickness | | (nm) | 20.0 | 20.2 | 19.8 | 20.1 | 19.8 |
| | Ratio of Al₂O₃ | | (%) | 50.5 | 51.2 | 51.0 | 50.0 | 50.7 |
| | Ratio of SiO₂ | | (%) | 49.5 | 48.8 | 49.0 | 50.0 | 49.3 |
| Oxygen Permeability Test for Packing Container | | | | A | A | A | A | A |
| Heat Resistance Test for Layered Polyester Film | | | | B | C | C | D | C |

TABLE 2

| | Item | | | Comparative Example 1 | Comparative Example 2 | Comparative Example 3 | Comparative Example 4 | Comparative Example 5 |
|---|---|---|---|---|---|---|---|---|
| Intrinsic Viscosity | | | (dL/g) | 0.7 | 0.7 | 0.7 | 0.7 | 0.7 |
| Production Condition of Polyester Film | Stretching Ratio of MD Direction | | (—) | 5 | 5 | 5 | 5 | 4 |
| | Temperature during Stretching MD Direction | | (° C.) | 120 | 120 | 120 | 120 | 110 |
| | Stretching Ratio of TD Direction | | (—) | 5 | 5 | 5 | 5 | 4 |
| | Temperature during Stretching TD Direction | | (° C.) | 105 | 105 | 105 | 105 | 105 |
| | Heat Fixation Temperature | | (° C.) | 200 | 200 | 180 | 140 | 120 |
| | Relaxation Ratio during TD Relaxation Treatment | | (%) | 5 | 5 | 5 | 5 | 5 |
| | Temperature during TD Relaxation Treatment | | (° C.) | 190 | 190 | 170 | 130 | 110 |
| Polyester Film | Breaking Strength | MD | (MPa) | 275 | 260 | 215 | 209 | 190 |
| | | TD | (MPa) | 252 | 255 | 218 | 225 | 195 |
| | Breaking Elongation | MD | (%) | 47 | 47 | 27 | 31 | 64 |
| | | TD | (%) | 46 | 42 | 31 | 26 | 64 |
| | Refractive Index | Nx | (—) | 1.6317 | 1.6292 | 1.6316 | 1.6231 | 1.5767 |
| | | Ny | (—) | 1.6219 | 1.6242 | 1.6205 | 1.6200 | 1.5705 |
| | | Nz | (—) | 1.4839 | 1.4801 | 1.4837 | 1.4825 | 1.5451 |
| | Plane Orientation Coefficient(⊿P) | | (—) | 0.143 | 0.147 | 0.142 | 0.139 | 0.0279 |
| | Heat Shrinkage Rate | MD | (%) | 3.3 | 4.3 | 5.5 | 22 | 29 |
| | | TD | (%) | 4.3 | 4.3 | 7.1 | 28.1 | 36 |
| | Haze | | (%) | 0.39 | 0.3 | 0.25 | 0.17 | 2.9 |
| | Total Light Transmittance | | (%) | 88.9 | 89.1 | 89 | 89.2 | 90.4 |
| | Thickness | | (μM) | 12 | 15.5 | 11.9 | 11.6 | 19.2 |
| | Oxygen Permeability | | (mL/m²/day/MPa) | 107 | 85 | 103 | 124 | 108 |
| | Water Vapor Permeability | | (g/m²/day) | 15.6 | 10.8 | 15.3 | 17.8 | 13.8 |

TABLE 2-continued

| | Item | | | | | | |
|---|---|---|---|---|---|---|---|
| Thin Film Layer | Thickness | (nm) | — | — | — | — | — |
| | Ratio of Al$_2$O$_3$ | (%) | — | — | — | — | — |
| | Ratio of SiO$_2$ | (%) | — | — | — | — | — |
| Oxygen Permeability Test for Packing Container | | | B | B | B | B | B |
| Heat Resistance Test for Polyester Film | | | A | A | B | C | C |

| | Item | | | Comparative Example 6 | Comparative Example 7 | Comparative Example 8 | Comparative Example 9 |
|---|---|---|---|---|---|---|---|
| | Intrinsic Viscosity | | (dL/g) | 0.7 | 0.5 | 0.5 | 0.7 |
| Production Condition of Polyester Film | Stretching Ratio of MD Direction | | (—) | 5 | 2.5 | 2.5 | 3.4 |
| | Temperature during Stretching MD Direction | | (° C.) | 110 | 95 | 95 | 110 |
| | Stretching Ratio of TD Direction | | (—) | 4 | 3 | 3 | 4 |
| | Temperature during Stretching TD Direction | | (° C.) | 105 | 85 | 85 | 105 |
| | Heat Fixation Temperature | | (° C.) | 120 | 120 | 200 | 200 |
| | Relaxation Ratio during TD Relaxation Treatment | | (%) | 5 | 1 | 1 | 5 |
| | Temperature during TD Relaxation Treatment | | (° C.) | 110 | 110 | 190 | 190 |
| Polyester Film | Breaking Strength | MD | (MPa) | 310 | 94 | Film was broken | Film was broken |
| | | TD | (MPa) | 258 | 134 | | |
| | Breaking Elongation | MD | (%) | 38 | 11 | | |
| | | TD | (%) | 47 | 69 | | |
| | Refractive Index | Nx | (—) | 1.6177 | 1.5650 | | |
| | | Ny | (—) | 1.6038 | 1.5780 | | |
| | | Nz | (—) | 1.4836 | 1.5480 | | |
| | Plane Orientation Coefficient($\Delta$P) | | (—) | 0.122 | 0.0235 | | |
| | Heat Shrinkage Rate | MD | (%) | 29 | 21 | | |
| | | TD | (%) | 49 | 27 | | |
| | Haze | | (%) | 1.3 | 0.78 | | |
| | Total Light Transmittance | | (%) | 89.8 | 89.9 | | |
| | Thickness | | (μM) | 19.5 | 18.8 | | |
| | Oxygen Permeability | | (mL/m$^2$/day/MPa) | 94 | 121 | | |
| | Water Vapor Permeability | | (g/m$^2$/day) | 11.5 | 8.4 | | |
| Thin Film Layer | Thickness | | (nm) | — | — | — | — |
| | Ratio of Al$_2$O$_3$ | | (%) | — | — | — | — |
| | Ratio of SiO$_2$ | | (%) | — | — | — | — |
| Oxygen Permeability Test for Packing Container | | | | B | B | — | — |
| Heat Resistance Test for Polyester Film | | | | D | C | — | — |

The invention claimed is:

1. A layered polyester film comprising a polyester film and an inorganic compound layer including mainly an inorganic compound, wherein
   the polyester film is a biaxially oriented polyester film including a dicarboxylic acid component containing mainly a furandicarboxylic acid and a glycol component containing mainly ethylene glycol,
   the inorganic compound layer is formed on at least one surface of the polyester film,
   the inorganic compound is at least one of aluminum oxide and silicon oxide, and
   the layered polyester film has a plane orientation coefficient ΔP of not less than 0.100 and not more than 0.200, a film thickness of not thinner than 1 μm and not thicker than 300 μm, and an oxygen permeability of not less than 0.1 mL/m$^2$/day/MPa and not more than 80 mL/m$^2$/day/MPa under a temperature of 23° C. and a humidity of 65%.

2. The layered polyester film according to claim 1, wherein the polyester film has a heat shrinkage rate of not less than 0.01% and not more than 30% when heated at 150° C. for 30 minutes.

3. The layered polyester film according to claim 1, wherein the polyester film has a heat shrinkage rate of not less than 0.01% and not more than 20% when heated at 150° C. for 30 minutes.

4. The layered polyester film according to claim 1, wherein the polyester film has a heat shrinkage rate of not less than 0.01% and not more than 10% when heated at 150° C. for 30 minutes.

* * * * *